United States Patent [19]

Rutherford

[11] 3,914,904

[45] Oct. 28, 1975

[54] GRINDING CUT-OFF APPARATUS

[76] Inventor: Harry Wayne Rutherford, 153 W. 155 St., P.O. Box 2316, Gardena, Calif. 90247

[22] Filed: July 1, 1974

[21] Appl. No.: 484,817

Related U.S. Application Data

[62] Division of Ser. No. 244,372, April 17, 1972, Pat. No. 3,826,427.

[52] U.S. Cl.................. 51/99; 29/157.4; 51/103 R
[51] Int. Cl.² ........................................ B24B 27/04
[58] Field of Search............. 51/99, 103 R; 29/157.4

[56] References Cited
UNITED STATES PATENTS

| | | | |
|---|---|---|---|
| 2,009,859 | 7/1935 | Robinson | 51/99 |
| 3,143,305 | 8/1964 | Hess | 51/99 |
| 3,146,553 | 9/1964 | Hensley | 51/99 |
| 3,452,483 | 7/1969 | Lambert | 51/99 |
| 3,466,808 | 9/1969 | Mess | 51/99 |

Primary Examiner—Al Lawrence Smith
Assistant Examiner—Robert C. Watson
Attorney, Agent, or Firm—Dominick Nardelli

[57] ABSTRACT

Cylindrical water tanks, such as used for water softeners, inherently corrode at the bottom and herein is taught that the tanks are repaired by removing the bottom dish with the use of a novel tool that moves around the tank and bears there against with a substantially uniform force thereby readily following the tank's contour, by sandblasting the interior for cleaning, by installing a new bottom dish to the cylindrical body with the use of a novel tool that automatically stops further penetration of the dish into the tank when a predetermined overall height of the tank is obtained, by welding the bottom dish to the body, by coating the interior with a non-corrosive plastic with the use of a novel spray gun apparatus that radially sprays the liquid plastic onto the inner walls of the tank as the spray nozzle moves axially therein and then the spray nozzle is adjusted to cause the spray to form an upward diverging cone to coat the underside of the top cover, and finally by allowing the plastic to harden.

1 Claim, 12 Drawing Figures

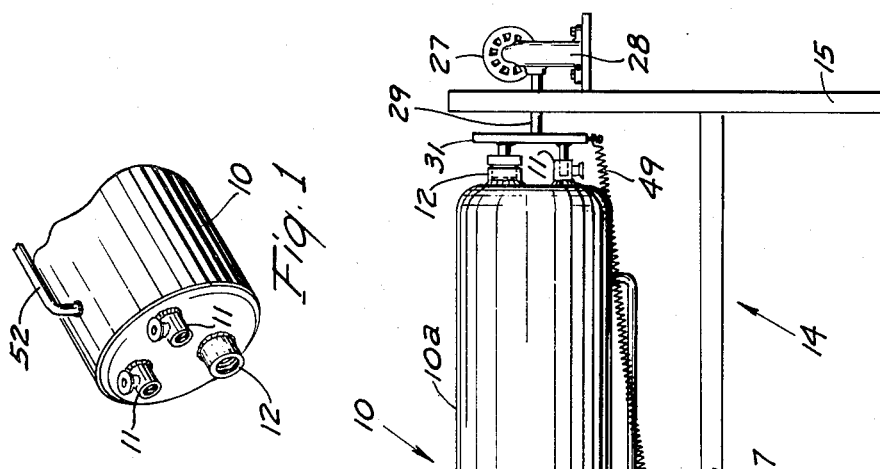
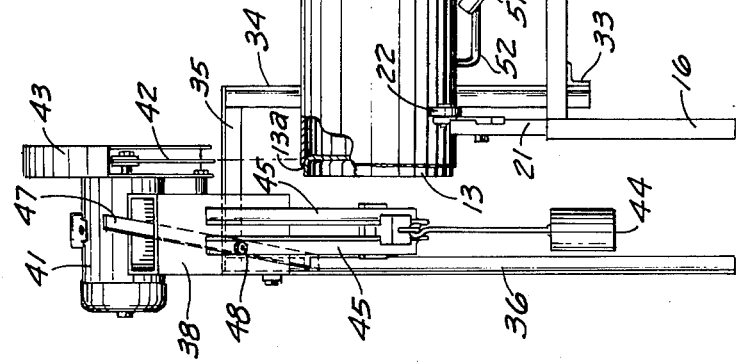
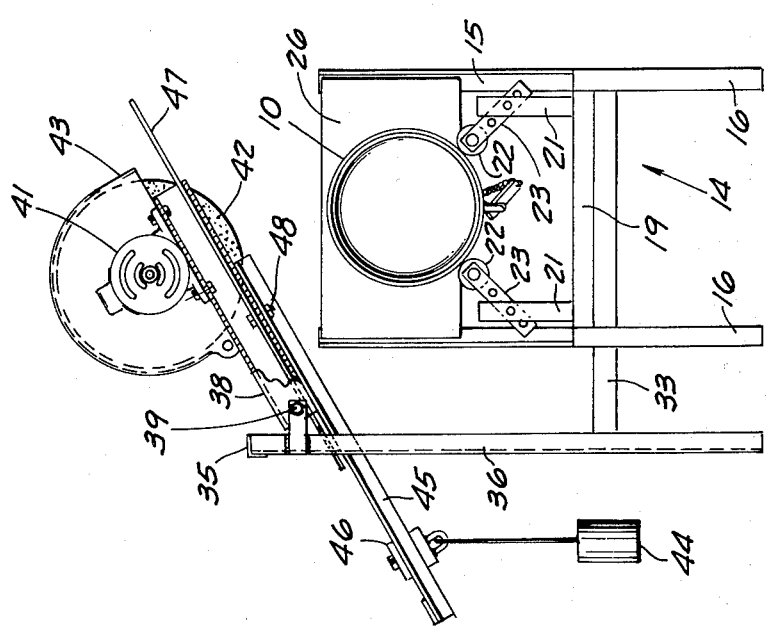

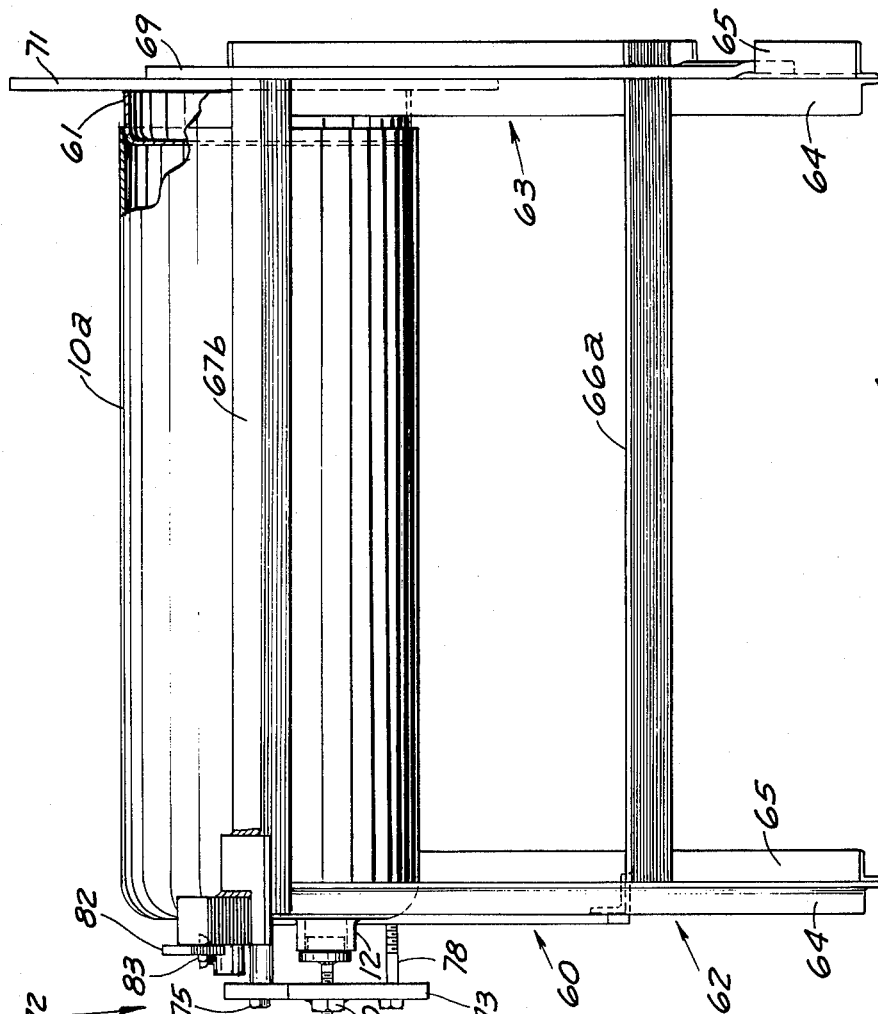
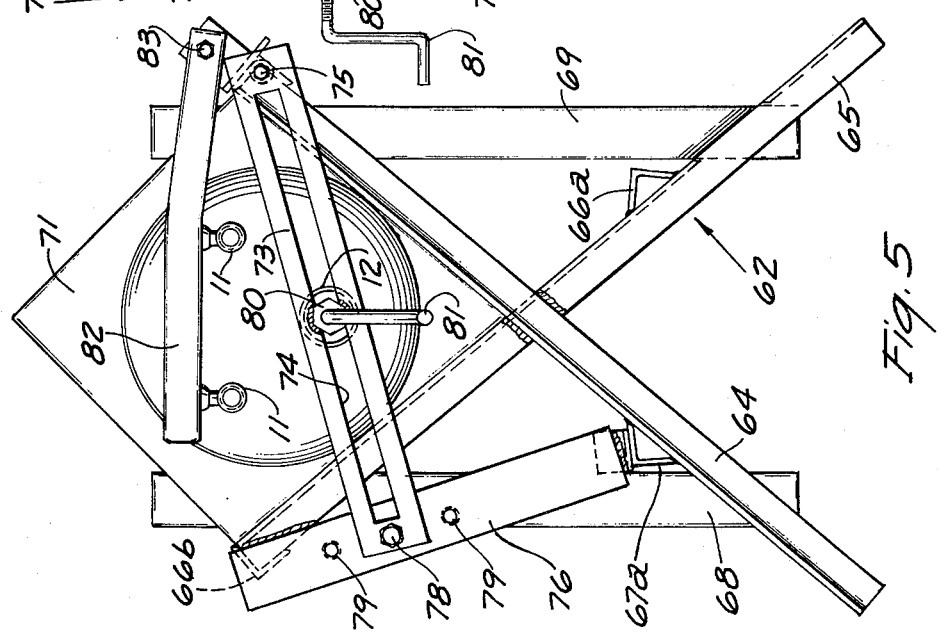
Fig. 4
Fig. 5

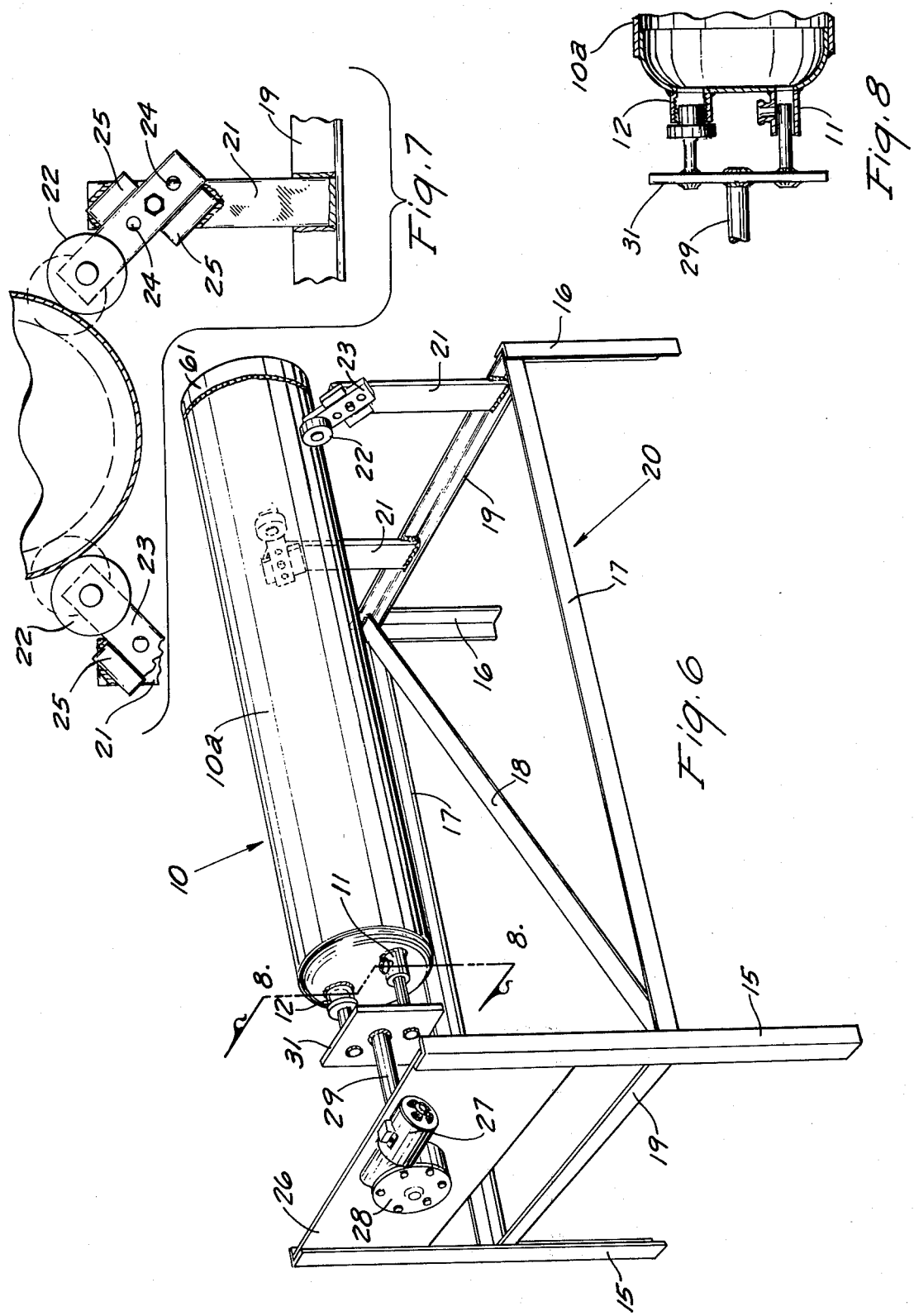

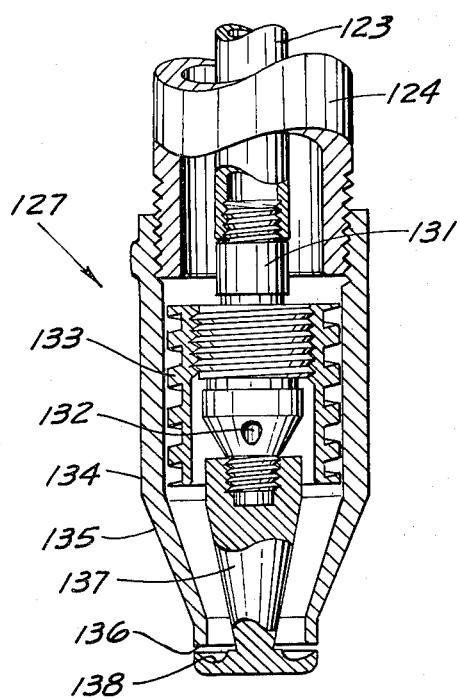
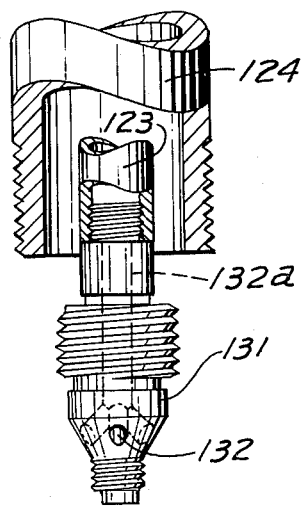
Fig. 11
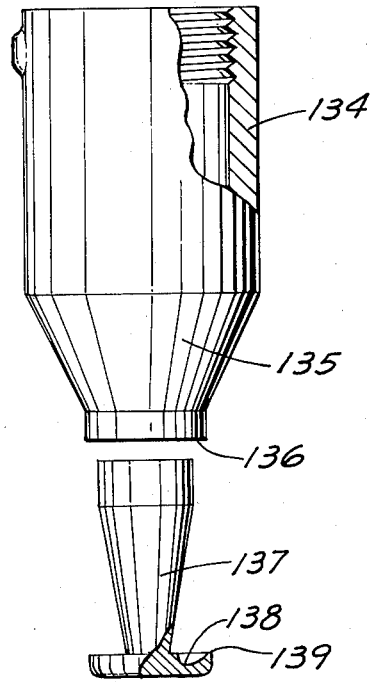
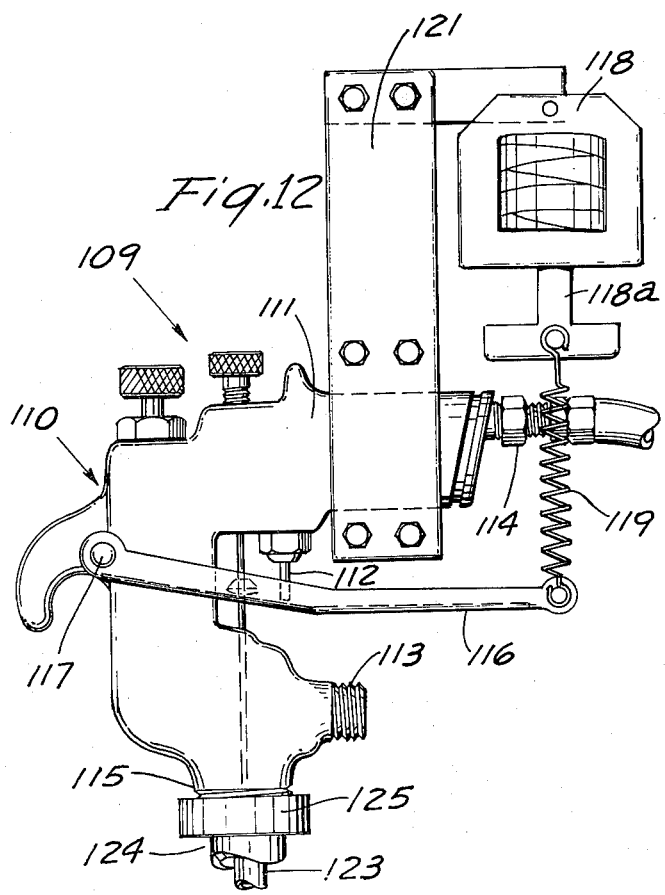

GRINDING CUT-OFF APPARATUS

This application is divisional of my co-pending Patent application Ser. No. 244,372 filed on Apr. 17, 1972, which has been assigned U.S. Pat. No. 3,826,427.

FIELD OF THE INVENTION

This invention relates to the art of repairing water tanks that have corroded and leak.

BACKGROUND OF THE INVENTION

Water tanks that are used, for example, for water softeners have generally a cylindrical shape wherein the top is closed with a convex dome having for example, three pipe fittings, one larger than the other two, and a concave bottom dish with a cylindrical flange inserted into the end of the tank cylinder and welded thereto. Through the larger fitting, the tank is filled with an ion-exchange compound that exchanges calcium ions found in hard water with sodium ions to make the water soft. Therefore, with the larger fitting suitably plugged, hard water is made to flow into one smaller fitting through the ion-exchange compound so that the water exiting from the other smaller fitting is what is normally classified as soft water. After a quantity of water, depending on its degree of hardness, flows through the ion-exchange compound, the compound must be reactivated to replenish the sodium ions and to remove the calcium which is now a salt compound trapped within the tank. This is done by flushing a brine solution through the tank and then rinsing out the excess brine. Naturally, with the presence of active ions such as sodium, the tanks being steel will corrode and the maximum corrosion inherently occurs at the bottom of the tank forming holes in the bottom dish and the cylindrical side. The holes in the cylindrical side are usually within one-quarter inch of the region where the end of the cylinder is welded to the bottom dish. Up to now, one would attempt to repair the tank by welding or brazing these holes, hoping to extend the life of the tank since the rest of the tank was relatively free of corrosion. However, the advanced stage of corrosion at the bottom soon formed other leaks. One could see that if the bottom dish was replaced, the tank life expectancy could be the same as a new one. However, the bottom dish being concave extends an appreciable distance into the tank, if one attempts to saw off the bottom with a saw, it has to be placed above the region of the bottom dish since the curvature of the dish would prevent the saw from cutting through it, causing the saw to bind. This would greatly reduce the volume of the repaired tank and therefore it would have to be replaced more frequently than the nonrepaired ones. Machining off the bottom dish at the weldbead is also not practical because the tanks are relatively out of round. Chipping off the weld to remove the bottom dish would be costly however these operations would preserve substantially the original tank volume.

Assuming a person employing the prior art removes the bottom dish by chipping the weld, the open tank would be sandblasted internally by conventional means before a new bottom dish is installed. The bottom dish is preferably concave with a cylindrical flange extending therefrom, and the tank, while in service, rests on the flange. Since, as mentioned above, the in and out water fittings or connections are made at the top and since the tanks must be interchangeable, the tanks should all be of the same height. The cylindrical flange on the bottom dish has an outside diameter of such a size that it forms a snug fit within the cylindrical wall of the tank. Up to now, to maintain the standard height, one has to force the dish into the tank and then measure its height. If the height is too great, he would push the dish further in and if too small, he would have to pull the dish out, consuming time in the operation and increasing costs. When the correct height is attained, the dish is welded to the cylinder and tested for tightness. The interior of the tank must be coated to prevent corrosion. Since the interior of the tank is now only accessible through the pipe fittings on the top, up to now a uniform protective coating of the inside has been difficult to attain. Before my invention, the liquid to coat the tank was poured through a pipe fitting into the tank and sloshed around to wet the interior thereof, and the excess poured off. Obviously this method is wasteful and does not insure a uniform coating.

Since soft water tanks come in several diameters, for example, 6½ inches, 8 inches and 10 inches, and some tanks have less than three fittings on the top, any equipment employed in removing and replacing the bottom dishes and employed in the other operations should preferably be able to handle all tanks. As mentioned above the tank heights are required to be uniform because the tanks are interchangeable even between the several diameters.

OBJECTS OF THE INVENTION

An object of this invention is to provide a method for repairing water tanks more reliably and economically than previous methods.

Another object is to provide an improved machine that is capable of removing the bottom dish of a tank substantially near the end of the cylindrical sidewall.

Another object is to provide an improved machine for rotating the tank on its axis and for feeding a cutting tool so that the cutting tool substantially follows any irregularities in the shape of the tank.

Another object is to provide an improved machine that inserts a new bottom dish into the end of a tank which machine indicates when the correct height of the tank is attained.

Another object is to provide a spray gun having a spray nozzle mounted on the end of a relatively long pipe so that the spraying operation is continuously performed as the nozzle moves axially within a closed tank.

Another object is to provide a spray nozzle that produces a radial spray pattern at one setting and a conical spray pattern by simply placing another setting thereon.

These and other objects and features of advantages will become more apparent, after studying the following description of the preferred embodiment of my invention together with the appended drawings.

BRIEF DESCRIPTION OF THE DRAWINGS:

FIG. 1 is a pictorial view of the top of a typical tank to be repaired.

FIG. 2 is a side elevation of a novel machine for removing the bottom dish of a tank.

FIG. 3 is the left end view of the machine shown in FIG. 2.

FIG. 4 is a side elevation of a novel machine for inserting new bottom dishes to the correct depth in one operation.

FIG. 5 is the left end view of the machine shown in FIG. 4.

FIG. 6 is a pictorial view of a machine for aiding the welding operation of the bottom dish to the tank.

FIG. 7 shows the adjustments to accommodate the various diameter tanks for the machines shown in FIGS. 2 and 6.

FIG. 8 is a section view taken on broken line 8—8 of FIG. 6 particularly showing the upper portion of the tank engaged by the machine.

FIG. 10 is a cross section of the novel spray nozzle.

FIG. 11 is an exploded view of the nozzle of FIG. 10.

FIG. 12 is an enlarged view of the trigger portion of the spray gun showing the solenoid operation thereof.

DETAILED DESCRIPTION OF THE DRAWINGS

Old Bottom Dish Removed

Figure 9:
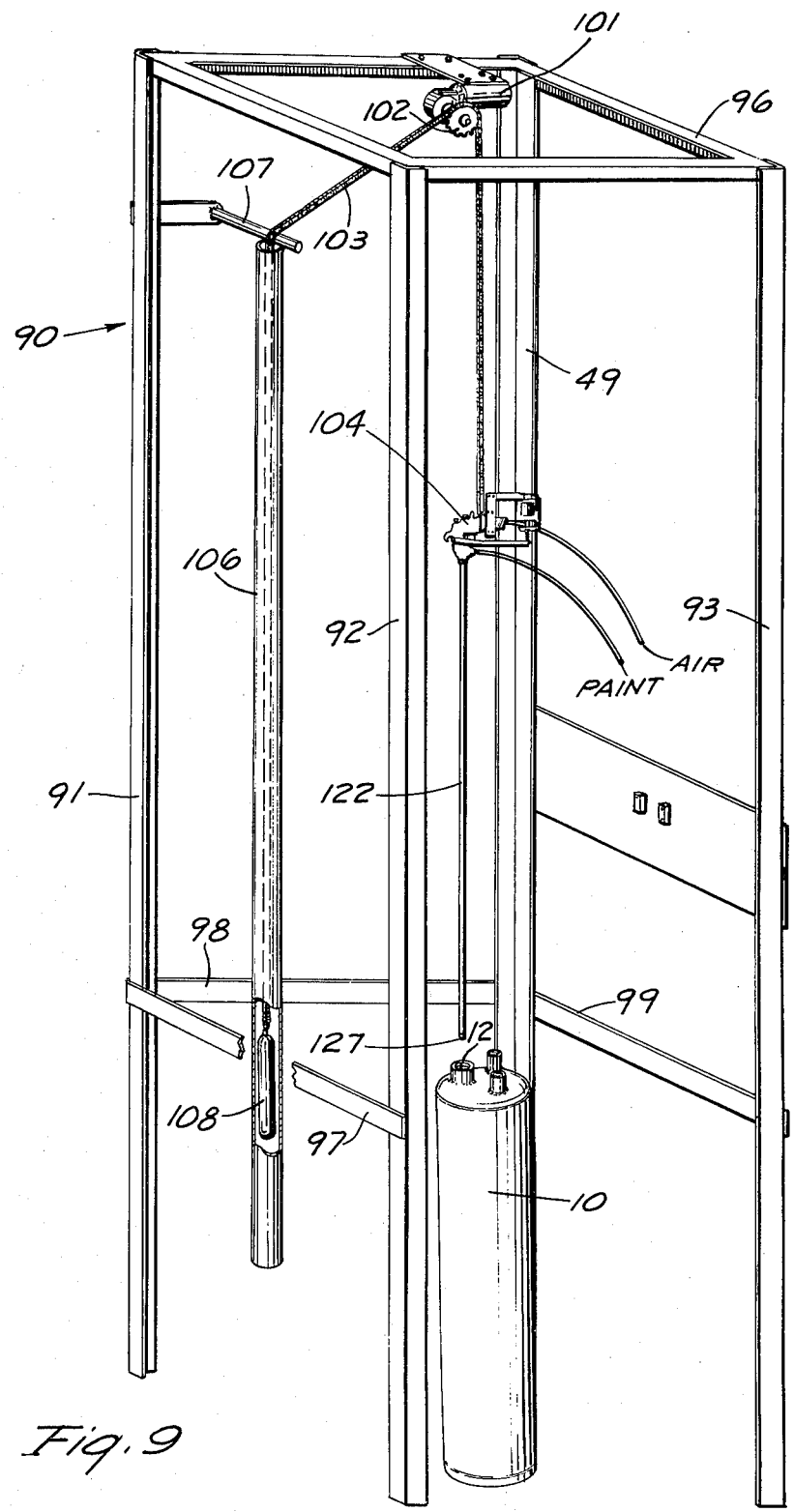
FIG. 9 is a pictorial view of a novel machine for spraying the insides of the tank.

Normally soft water tanks are shipped by the soft water supplier to the repair plant with the ion-exchange compound removed and also with any internal piping removed so that the inside of the tank is clear of obstruction. However, the standard quick disconnect fittings as indicated by item 11 in FIG. 1 are left on the tank 10. The pipe plug is not in place in the larger hole or pipefitting 12 which is used to fill the tank with the ion-exchange compound. As mentioned above, the distance between the fittings 11 and the bottom of the tank has to be maintained to within, for example, one-quarter of an inch since the mating fittings on the various homes are fixed.

The first process at the repair plant is to remove the bottom dish from the tank. Referring to FIGS. 2 and 3, there is shown a novel bottom removal apparatus 14. The tank 10 is positioned horizontally showing the fittings 11 and 12 disposed to the right in FIG. 2 with the bottom dish 13 to the left. The tank 10 is shown partially broken away to show the normal amount the bottom dish 13 protrudes into the tank body 10a. The apparatus 14 is preferably made of structural steel elements. Since the apparatus 14 for removing the bottom dish is substantially the same as a welding aid apparatus 20 (FIGS. 6, 7, 28) used as an aid in welding a new bottom dish to the tank, the similar parts of both will be described together. The apparatus includes two long legs 15 and two short legs 16 connected together by two long parallel spreaders 17 and two short parallel spreaders 19 and a cross brace 18. Welded to the short spreader 19 over the short legs 16 are two upright bars 21 to each of which is bolted a roller assembly. The roller assembly consists of a roller 22 mounted on the end of an adjustment bar 23 (more clearly shown in FIG. 7) which has, for example, three holes 24 which are used to adjust for the three different diameter sizes of the tanks as will become more apparent hereinafter. For better control of the different size tanks, the adjustment bar 23 is secured by blocks 25 to cause the bar 23 to be movable along a substantially radial line from the center of the tanks, as shown by the dash lines in FIG. 7.

At the upper ends of the long legs 15 is welded a plate 26 on which is mounted an electric motor 27, coupled to a reduction gear 28. An output shaft 29 extends through a suitable opening (not shown) in the plate 26 and is disposed substantially coaxial with the tank. On the end of the shaft 29 is mounted a clutch means 31 which engages at least two of the fittings in the top of the tank 10. The clutch means 31 is removable so that different design means 31 can be installed for different tanks.

Referring now only to FIGS. 2 and 3, the portion of apparatus 14 that is not common to apparatus 20 will be described. A horizontal beam 33 is welded to spreaders 17 near the short legs 16, and extends to the left, as shown in FIG. 3. Extending upward from the end of the beam 33 is a strut 34 (FIG. 2) to which is welded a horizontal member 35 that is supported by a vertical support leg 36. A box member 38 is suitably mounted to leg 36 to pivot about an horizontal axis defined by a bolt 39 in FIG. 3. Onto box member 38 is mounted an electric motor 41 to which is mounted a grinding wheel 42 and shield 43. The distance that motor 41 is mounted from the axis defined by bolt 39 is substantially equal to the distance from bolt 39 to the center of the tank 10. This ensures that the grinding wheel 42 is substantially tangent to the cylindrical surface of the tank, thereby producing a cleaner and quicker cut. The weight of the motor and grinding wheel is balanced by a weight 44 suitably suspended from two parallel angle beams 45 (FIG. 2) that are in turn welded to the underside of the box member 38. The weight 44 is chosen such that a fractional portion of the weight of the motor is made to bear on the tanks, which portion is sufficient to cut the metal freely and not stall the motor. A skilled machinist can readily make the proper adjustment by means 46 to achieve this result. Since the motor has a tendency to drop, a lever 47 is employed that pivots about a bolt 48 to engage leg 36 as shown in FIG. 2 to hold the motor 41 up when not in use.

To remove the bottom dish 13, the tank 10 is placed on apparatus 10 as shown in FIG. 2, the clutch plate engages the respective fittings 11 and 12. A tension spring 49, having a suitable clip 51 at its end is hooked onto a handle 52 (that is part of the tank) to restrain the tank from any vibration. Since the tanks are of equal height, the grinding which is positioned so that as the motor 41 is rotated the grinding wheel contacts the weld bead 13a and bearly contacts the cylindrical body 10a of the tank. The tank 10 is rotated on its axis by energizing motor 27. Preferably, the tank is rotating about 5 R.P.M. The motor 41 rotates the grinding wheel 42 about 1800 R.P.M. To lower the wheel 42, the lever 47 is moved to the left, as viewed in FIG. 2. The wheel 42 is preferably guided by the operator into contact with the tank 10. Within 1 minute, the wheel grinds away the weld and is cutting into the dish 13. The operator observes this and lifts the wheel 42 and locks the motor 40 in its up position by moving the lever 47 to the right. The tank is removed from the apparatus 10 and the dish 13 falls free. If it does not, a slight tap will cause it to fall free. Since the grinding wheel 42 is being urged against the tank by gravity, the possibility of the wheel stalling is removed, especially when the tank is out of round. This is so because the wheel 42 follows the curvature to rise and fall therewith. This apparatus, since it does not need to cut completely through the bottom dish 13, saves further time.

With the bottom dish removed, a sand blasting unit is readily inserted into the cylindrical body 10a to clean it, making the unit ready for the installation of a new bottom dish.

NEW BOTTOM DISH INSTALLED

Referring to FIGS. 4 and 5, there is shown a preferred apparatus 60 for quickly installing a new bottom dish 61 into the cylindrical body 10a. The apparatus 60 has two pairs of crossing legs, front legs 62 and back legs 63. Each pair of legs is made of two crossing angle-iron members 64 and 65. Both angle members 65 are braced by a lower horizontal angle brace 66a and an upper horizontal angle brace 66b, while both angle members 64 are also braced by a lower horizontal angle brace 67a and an upper angle brace 67b forming a cradle. At the back of legs 63 are welded two vertical bars 68 and 69, and between the angle members 64 and 65 above the crossing is welded a plate 71, disposed vertically. Bars 68 and 69 aid in supporting the plate 71 in the vertical position.

The cylindrical body 10a can be readily placed within the cradle with the new bottom dish 61 disposed against the plate 71, as shown. The next operation is to push the new dish 61 into the body 10a a predetermined amount. This is readily accomplished by attaching a pressing means 72 at the front of the apparatus. The means 72 includes an adjustable bar 73 having an elongating slot 74 which bar 73 is hinged by a pin 75 at one end to rotate about a horizontal axis. The pin 75 is suitably fixed to member 64 on the front legs 62. The other end of bar 73 is fixed to a fixed member 76 welded between angle braces 67a and 66b. Member 76 has, for example, three threaded holes 79 into which a bolt 78 may be selectively threaded. Bolt 78 fits freely into a hole in bar 73. Within slot 74 is disposed a slidable nut 80 engaging a threaded crank 81, that engages the large fitting 12 in the tank. Therefore, by turning the crank 81, the dish 61 is pressed into the body 10a. A marker bar 82 which freely pivots about a pin 83 is used to determine when the dish 61 is disposed sufficiently within the body 10a as the bar 92 comes to rest on at least one of the quick disconnect fittings 11 when the correct tank height is obtained. The three threaded holes 79 and the slidable nut 80 allow the apparatus 60 to accommodate various sizes and designs of tanks. Now the dish 61 is welded to the body 10a. The dish 61 is preferably tack welded before removing to the next apparatus.

NEW BOTTOM DISH WELDED

Referring to FIG. 6 and as mentioned above, the apparatus 20 that is used as an aid in the welding operation is shown. The tank 20 with the new bottom 61 is placed horizontally as shown in FIG. 6. The clutch means 31 is chosen to fit the design of the tank and engages the respective fittings 11 and 12. Motor 27 is energized and the tank 10 rotates now, for example, relatively slow — about one-half R.P.M. or at a speed to allow a welder to weld the dish 61 to the body 10a. If there are any serious holes in the body 10a, the welder can readily observe them and suitably repair them by filling the openings with a suitable metal. The tank 10 is tested for leaks and, if free of leaks, is now to be coated internally with a plastic to retard or practically eliminate future corrosion.

COATING THE INTERIOR OF THE TANK

Referring to FIG. 6 and as mentioned above, the apparatus spraying, the interior of the tank 10 with a liquid coating such as an epoxy resin that hardens at room temperature. The apparatus 90 includes four legs 91, 92, 93, and 94, made of angle iron which are welded at their tops to a square frame 90 and to which are welded three brace bars 97, 98, and 99, as shown, at a convenient place between the ends of the legs to form a tall pedestal. There is no bar similar to bars 97, 98, and 99 disposed between legs 92 and 93, thereby providing a convenient opening through which a tank 10 can be placed within and withdrawn from the pedestal. Suitably supported at the approximate center of the frame 90 is an electric motor 101 that actuates a sprocket 102 to rotate about a horizontal axis. Over the sprocket is disposed a chain 103. On one end of the chain 103 is disposed a novel spray gun means 104 and the other end of the chain is disposed within a vertical tube 106 suitably welded to bar 97, near the bottom, and to a rod 107, at the top. The end of the chain within the tube is attached to a counter-weight 108 and the tube 106 prevents entanglement of the chain when motor 101 rotates socket 102 to lower and raise the gun means 104.

The novel spray gun means 104 has a conventional trigger position 109 as shown in FIG. 12. The trigger position 109 has a pistol grip 111, a plunger actuator 112, a liquid fitting 113 through which liquid is coupled, an air fitting 114, through which compressed air is coupled, and a spray fitting 115, to which a spray head is attached. However, a trigger 116 thereon has been modified so that, at one end, it pivots about a pin 117 and the other end is connected to an electric solenoid 118 by a tension spring 119. The solenoid 118 is mounted to the grip 111 by a bracket 121. Therefore, whenever solenoid 118 is energized, an armature 118a moves upward and trigger 116 rotates upward, as viewed in FIG. 12 to start the spraying operation.

To the spray fitting 115 is attached a novel spray head means to allow for spraying the interior of the tank. To fitting 115 is attached a long coaxial tube 122 (FIG. 9) having an inner tube 123 and an outer tube 124 (FIG. 10) with a collar 125 (FIG. 9) for attaching to fitting 115. On the lower end of the coaxial tube is placed a spray head 127 more clearly shown in FIGS. 10 and 11. To the end of the inner tube 123 is threaded a fitting 131 having a central base that communicates with, for example, three ports 132 that extend from the central bore 132a outwardly and downwardly as viewed in FIGS. 10 and 11. Compressed air is fed through ports 132. Around fitting 131 is disposed a helical fitting 133 having a helical groove formed on its outside surface, and fitting 133 is suitably threaded tightly to fitting 131. Around fitting 133 is disposed a sleeve 134 that is threaded onto the outer tube 124. The sleeve 134 and fitting 133 form a helical passageway through which the liquid passes. The lower end of sleeve 134 has a fustro-conical portion 135 that terminates at an angular edge surface 136 that is normal to the axis. Closing the end of the sleeve 134 is a plug 137 that is threaded tightly onto fitting 131. The plug 137 has an annular surface 138 shaped into a concave half torus. The plug 137 is spaced from sleeve 134 to form an annular opening between surfaces 136 and 138. The outside diameters of sleeve 134 at surface 136 and plug 137 where they are adjacent to each other are substantially the same. However, the inside diameter of surface 136 is appreciably smaller than the diameter of the half torus surface 138, as shown. For example, the width of surface 136 is about 0.06 inches, while the width of surface 139 (FIG. 11) is about 0.005 inches. As sleeve 134 is threaded further onto outer tube 124, the annular opening increases, and, when threaded in the reverse direction, the annular opening decreases. When the annular opening is relatively small, the geometry of the spray is radial. When the annular opening is larger, the spray pattern is conical and directed upwardly. The reason for this feature is believed to be as follows: Since the compressed air and liquid is directed by the half torus surface 138, they tend to follow that form. Therefore, when the opening is relatively large, the air and liquid miss interacting with surface 136 and continue on their travel upwardly and outwardly. When the opening is made smaller, the air and liquid interact with surface 136 and are directed radially. This feature is utilized in the following manner:

The tank 10 is placed within the pedestal, as shown in FIG. 9, The annular spray opening is made small by twisting to the right sleeve 134. The motor 101 is started and the spray head 127 enters the opening 12. As soon as it enters, solenoid 188 is energized and a radial spray pattern is formed. The spray is maintained as the head 127 moves downward. When the head touches the bottom of the tank, the motor 101 is reversed and the spray head 127 is lifted as the spray continues. Before the head 127 exits from opening 12, the spray is stopped. When the head 127 is free of the tank 10, the spray opening is opened by twisting to the left sleeve 134. The motor 101 is again started to lower the spray head 127 into opening 12. As soon as the head 127 enters opening 12, the spray is started. Now the spray is directed upward and the inside of the top portion of tank 10 is covered with liquid. The head 127 is lowered until it is about one-third of the distance into the tank 10 and the head 127 is lifted by reversing the motor 101. The spray is again stopped before the head 127 exits from the opening. The inside of the tank is now coated with liquid plastic. The bottom dish 61 is coated by surplus plastic flowing to the bottom and by using a manually suitable dabber (not shown) on the end of stick. The dabber is inserted within opening 12 and the liquid plastic is spread over the interior of the dish 61 with the dabber. The plastic is allowed to harden and the tank is ready to be reused.

Although only the preferred embodiment of my invention has been described, the invention is not limited to the described embodiment but includes all embodiments coming within the scope of the claims.

I claim:

1. An apparatus for removing a concave dish welded to one end of a hollow, cylindrical body, which has a bar disposed and fixed parallelly spaced therefrom; said apparatus comprising:
   a frame;
   a pair of spaced rollers mounted on said frame and disposed to rotate about a respective parallel, horizontal axis so that said body is capable of being rotatably supported thereon in the horizontal position;
   a clutch means for engaging and supporting the end of said body opposite said dish, to rotate said body about another horizontal axis;
   a beam disposed to pivot about another horizontal axis;
   a motor and grinding wheel mounted on said beam so that said grinding wheel moves down towards said body as said beam pivots;
   a counter-weight mounted on said beam so that said grinding wheel is lifted off said body by gravity;
   a clip capable of being removably fastened to said bar; and
   a tension spring disposed between said clutch means and said clip to dampen vibrations.

* * * * *